(12) United States Patent
Mowatt et al.

(10) Patent No.: US 10,235,864 B2
(45) Date of Patent: Mar. 19, 2019

(54) TRACKING ITEMS IN A CONTAINER

(71) Applicant: Microsoft Technology Licensing, LLC, Redmond, WA (US)

(72) Inventors: David Mowatt, Dublin (IE); Terry Farrell, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 15/424,159

(22) Filed: Feb. 3, 2017

(65) Prior Publication Data

US 2018/0225949 A1 Aug. 9, 2018

(51) Int. Cl.
*G08B 13/14* (2006.01)
*G08B 21/24* (2006.01)
*G06Q 10/08* (2012.01)
*G06F 17/30* (2006.01)

(52) U.S. Cl.
CPC ....... *G08B 21/24* (2013.01); *G06F 17/30864* (2013.01); *G06Q 10/0833* (2013.01)

(58) Field of Classification Search
None
See application file for complete search history.

(56) References Cited

U.S. PATENT DOCUMENTS

| 9,454,728 | B1 * | 9/2016 | Bender | G06Q 30/0631 |
| 2006/0077040 | A1 * | 4/2006 | Bormaster | G06K 7/0008 |
| | | | | 340/10.2 |
| 2006/0087432 | A1 * | 4/2006 | Corbett, Jr. | G06Q 10/08 |
| | | | | 340/572.1 |
| 2008/0204233 | A1 * | 8/2008 | Agrawal | G06Q 10/08 |
| | | | | 340/572.1 |
| 2009/0243853 | A1 * | 10/2009 | Breslau | G06Q 10/08 |
| | | | | 340/572.1 |
| 2011/0129117 | A1 | 6/2011 | Ross et al. | |
| 2012/0293341 | A1 | 11/2012 | Lin | |
| 2014/0062699 | A1 | 3/2014 | Heine et al. | |
| 2014/0089243 | A1 * | 3/2014 | Oppenheimer | G06F 21/50 |
| | | | | 706/46 |
| 2015/0060543 | A1 * | 3/2015 | Bellows | G06Q 30/06 |
| | | | | 235/385 |

(Continued)

OTHER PUBLICATIONS

"Item Reminder", http://www.remembermythings.com/, Retrieved on: Nov. 4, 2016, 3 pages.

(Continued)

*Primary Examiner* — Julie B Lieu
(74) *Attorney, Agent, or Firm* — Michael Best & Friedrich LLP (57) ABSTRACT

A method for alerting a user when an item is missing from a container. The method comprising implementing, by an item tracking system, a plurality of steps. The steps comprise determining an expected set of items for the container, using an item sensor associated with the container to determine a current set of items in the container, comparing the current set with the expected set to detect whether any of the expected items is missing from the container, determining a packing area for the container, tracking a location of the container, and causing an alert to be outputted via a user interface, in response to the container leaving the packing area with any of the expected items missing.

20 Claims, 6 Drawing Sheets

(56) References Cited

U.S. PATENT DOCUMENTS

| | | | |
|---|---|---|---|
| 2015/0170496 A1* | 6/2015 | King | G08B 21/24 |
| | | | 340/686.6 |
| 2015/0237980 A1* | 8/2015 | Shah | A45C 13/18 |
| | | | 340/568.1 |
| 2016/0092709 A1* | 3/2016 | Rinehart | G06K 19/07758 |
| | | | 340/539.13 |

OTHER PUBLICATIONS

"Never lose your keys again! Trakkies warn you if you're about to leave the house without your purse, phone and more", http://www.dailymail.co.uk/sciencetech/article-3165203/Never-lose-keys-Trakkies-warn-leave-house-without-purse-phone-more.html, Published on: Jul. 17, 2015, 20 pages.

* cited by examiner

TRACKING ITEMS IN A CONTAINER

TECHNICAL FIELD

The present invention relates to the detection of missing items in a container.

BACKGROUND

There are many scenarios where a user needs to take a container (bag/suitcase/tool belt/vehicle etc.) to a remote location, where the container should contain a certain set of items. This may be a schoolbag with the right books/materials for the day, or a building surveyor's toolkit containing tools that will measure a particular type of building, or a vehicle containing service parts to repair a vehicle or a briefcase containing brochures and samples that will be used by a salesman when visiting a prospective customer.

SUMMARY

According to a first aspect of the present disclosure there is provided a method for alerting a user when an item is missing from a container, the method comprising implementing, by an item tracking system, the following steps: determining an expected set of items for the container; using an item sensor associated with the container to determine a current set of items in the container; comparing the current set with the expected set to detect whether any of the expected items is missing from the container; determining a packing area for the container; tracking a location of the container; and causing an alert to be outputted via a user interface, in response to the container leaving the packing area with any of the expected items missing.

Outputting the alert, when necessary, when the container leaves the packing area means the user may receive it when he (including she) is most likely to need it.

In embodiments, the list of expected items for the container is determined based on contextual information pertaining to the user and/or the container.

In embodiments, the contextual information is held in a data store of a personal information manager system in association with a user account of the user and accessed from the data store.

In embodiments, the contextual information comprises calendar data and/or email data and/or task data and/or customer data.

In embodiments, the contextual information pertaining to the container is held in a container database and/or the contextual information pertaining to the user is held in a people database.

In embodiments, the method further comprises determining a current state for at least one item, and determining an expected state for said item, comparing the current state with an expected state for the item, and outputting a second alert if the current state is unexpected.

In embodiments, the second alert is outputted at a predetermined interval before an expected time of the container leaving the packing area or in response to the container leaving the packing area.

In embodiments, the method further comprises determining based on one or more properties of a packing area, the expected set being determined for the packing area based on the determined properties of the packing area.

In embodiments, a different expected set of items is determined for each of a plurality of packing areas based on one or more determined properties of that packing area.

In embodiments, comprising modifying the expected set of items for a destination packing area, by adding and/or removing at least one expected item, wherein once the container has arrived in the destination packing area, an alert is outputted in response to it leaving the destination packing area with any of the items in the modified set missing.

In embodiments, the people database identifies the user as an owner of the container.

In embodiments, the step of using the item sensor associated with the container to determine the current set of items is performed in response to the container leaving the packing area.

In embodiments, each item is uniquely identified in an item database.

In embodiments, each item is represented in the item database as an instance of one or more item classes.

In embodiments, the container and/or at least one of the items in the container comprises a network interface for connecting to the item tracking system, wherein the item sensor connects to the item tracking system via that interface.

In embodiments, the item sensor is a near field communication enabled sensor and/or a wireless person area network enabled sensor and/or a camera.

In embodiments, tracking the location uses a location sensor, the location sensor is a Global Positioning System (GPS) locator and/or a camera and/or triangulation circuitry.

According to another aspect of the present invention there is provided a system for carrying out any of the methods described herein.

In embodiments, the item tracking system is configured to determine the expected set by creating associations between entries in an item database with an entry in a container database.

According to another aspect of the present disclosure there is provided a computer program product comprising code embodied on computer-readable storage and configured so as when run in a computer system to perform any of the methods described herein.

In embodiments, each item is uniquely identified using a Radio Frequency Identification (RFID) tag.

In embodiments, the alert is an audible and/or visual and/or haptic alert.

In embodiments, the item tracking system further comprises a personal information manager system server.

In embodiments, the visual alert is any one or more of a notification, an email, a Short Message Service (SMS) message, an in-app text message, a chat application message, and/or a picture message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present invention and to show how the same may be put into effect, reference will now be made, by way of example, to the following drawings in which.

DETAILED DESCRIPTION

Losing belongings and other such items by leaving them behind has long been an issue for many an individual. Not only the failure to take an object with oneself to the location at which it will be needed, but also the failure to retrieve an object from a location where it has previously been used. Typically, a list of such items would be made in order to remind an individual of any items they need to remember. A checklist that can be referred to and where items can be ticked or checked off when gathered for use or transportation. In more recent times this process has been translated into the technical age, with use of computerized lists and check boxes. However, the traditional list and the later computerized implementations of the traditional checklist still require an element of remembering from the user. Be this to remember to enter the item on the checklist in the first place, remembering to check it off when located, or making sure that the wrong item isn't incorrectly checked as being present when in fact it is in reality missing. The scope for human error in these systems still persists.

The embodiments described herein provide a method for determining an expected set of items for a container, using a sensor of a container to determine the items within that container, and then comparing these two sets of items to determine any items that are missing from the container. That is to say any items in the expected items set and are not currently in the container and, as such, not part of the current set of items. There is also a packing area defined for the container. For example, a home/office/warehouse/garage etc. The packing area can be a local packing area, such as a warehouse, office or other 'base', or a remote area being visited and from which certain items need to be brought back (such as a school or customer site). The location of the container is tracked. Thus it is possible to determine whether the container is in a packing area, or has left the packing area. An alert is output via a user interface, in response to the container leaving the packing area with an expected item missing.

The method is implemented by an item tracking system (102 in the figures), which is a centralized back-end system in the described examples.

A number of observations may be made with regard to missing items—(1) that the user is negatively impacted if certain items are missing (2) that it is possible for a system to know ahead of time which items should be expected (3) that the expected set of items may be different depending on the day/time and/or the remote location being visited.

Various means of detecting when a user has forgotten to place items in a container are described, such that if the user leaves the office/depot (or other packing area) without those items, he can be alerted.

Figure 1:
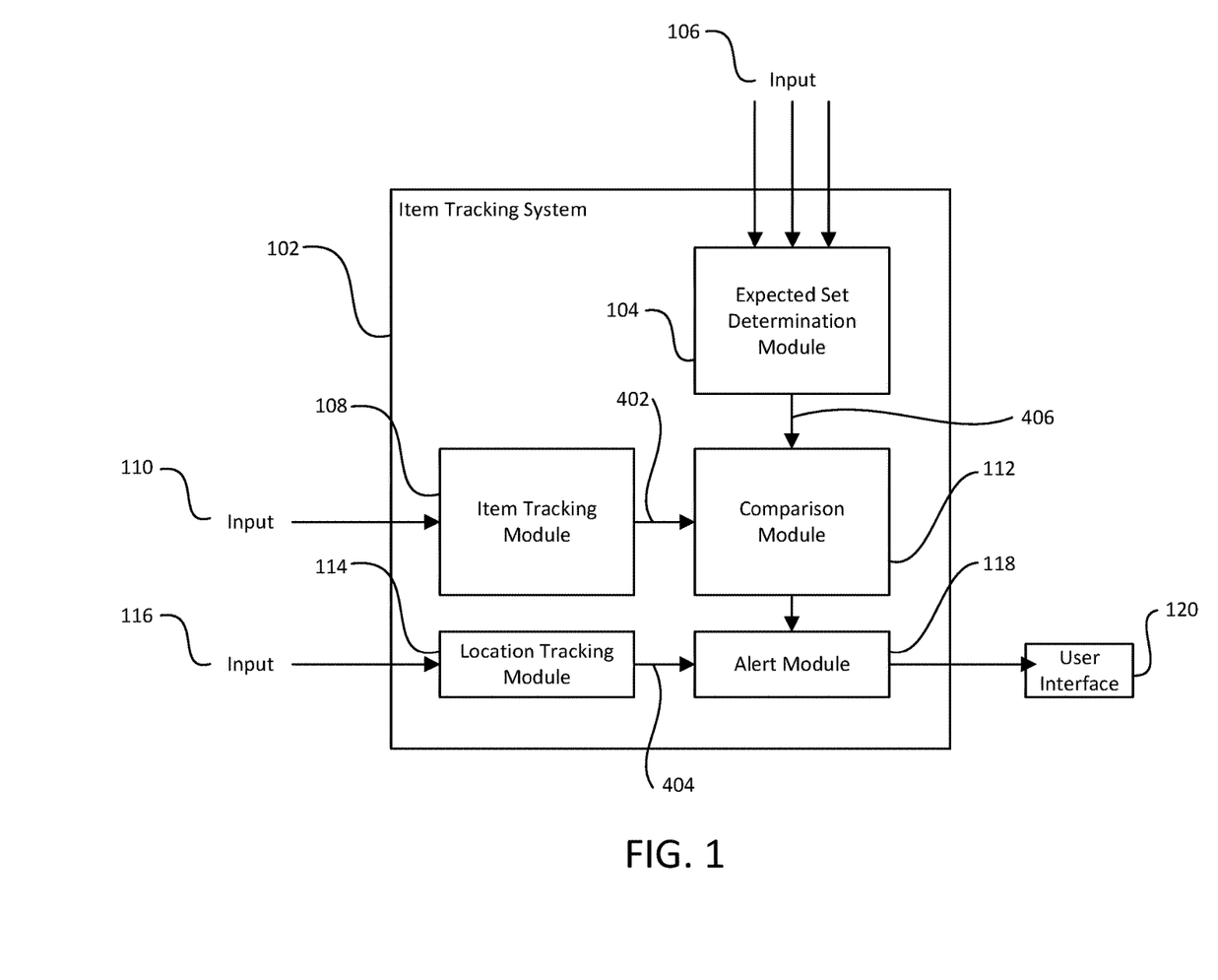
FIG. 1 shows a schematic block diagram of an item tracking system.
Figure 2:
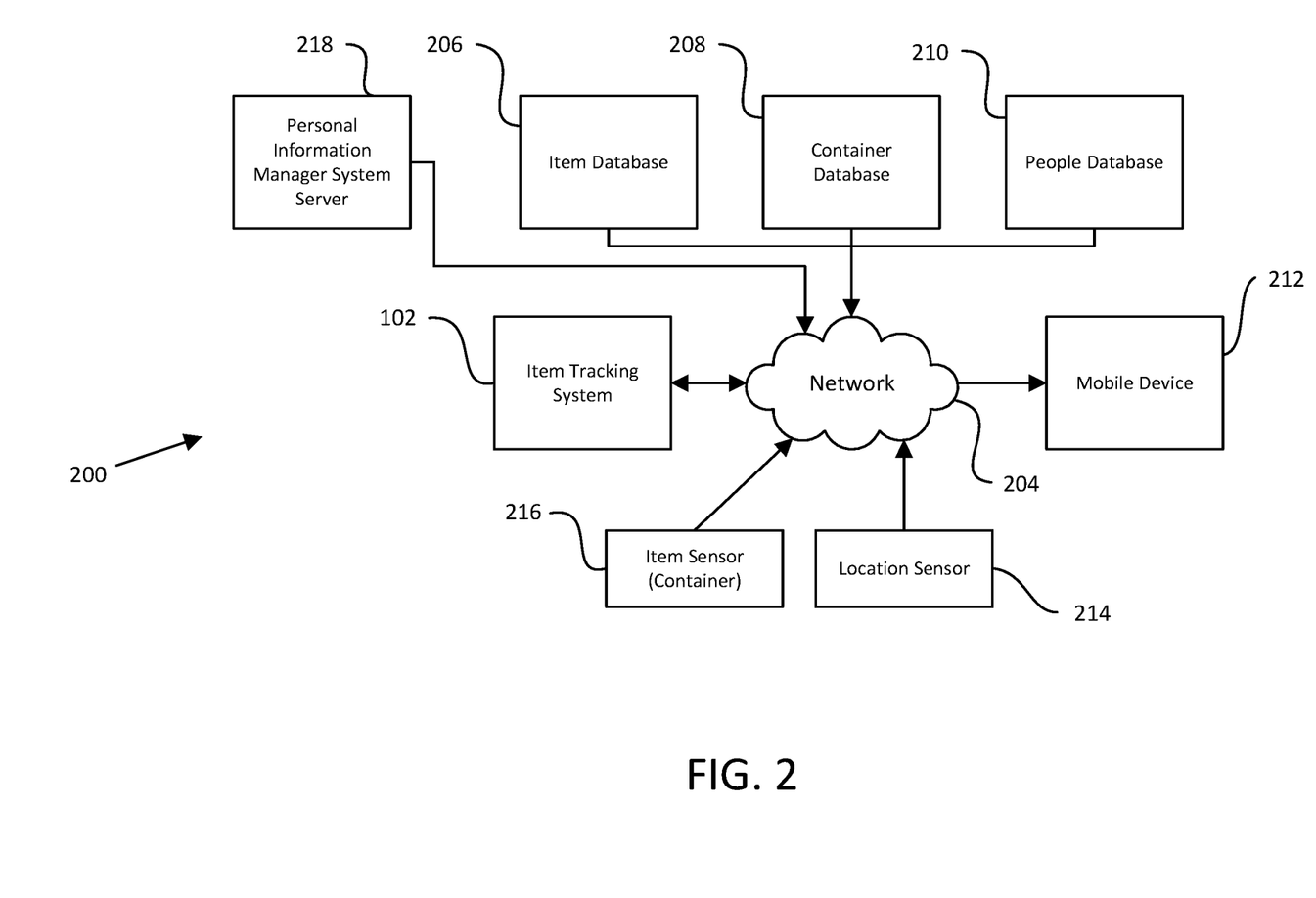
FIG. 2 shows a schematic diagram of a computer system showing the various connections between system elements including the item tracking system and its connections to associated elements via a network.

The item tracking system has access to a RESOURCES database (item database 206, FIG. 2). This contains a list of physical items and their tag identification (ID) (e.g. RFID identifier). The item tracking system may also have access to a PEOPLE database (210). This is a list of which employees exist in the system (or may be a list of school children in a house). For example, this database may be the Microsoft Azure Active Directory system. The item tracking system also has access to a CONTAINER database (208, FIG. 2). This is a real-time list of which resources are detected to be in a given container (be it a bag, a case, a van etc.). It may further record which employees use which container(s). The item tracking system also comprises a REQUIRED RESOURCES system (expected set determination module 104, FIG. 1). This resource computes which resources are required for a given employee/user at a given time, depending on where they are scheduled to visit.

The item tracking system can be used by an administrator or user who may use a web portal or user interface for connecting to the databases discussed above in order to register an ID (identifier) of the container in the container database. S/he may then register (or scan) the IDs of items into the item database thereby creating an entry for that container therein. S/he may manually enter metadata such as name, or image for the item, or (if the device comes with a built-in tag), an external service may be able to map the tag ID to the type of item. Item metadata information may also be retrieved from a global database, such as a database of school books, or a database of item descriptions. S/he may finally enter metadata for each person (e.g. in the house) into the people database. Similarly, such information may be determined from global databases, such as school enrollment databases etc.

The administrator is able to configure the REQUIRED RESOURCES system to create a rules-based system of which items are required by which people on which days/hours. The container database entries may be annotated to say which people "own" which container. Note the term "own" refers to the person assigned or otherwise associated with the container, and does not necessarily imply ownership in a legal sense. This configuration allows the system to be able to answer the query, including the context 'given the next appointment' or 'for the whole of today', does the container currently contain all required resources for the upcoming appointment/day? The container itself may have a user interface for outputting an alert if such capabilities are part of the container, or the user may have a mobile device that is registered to them which includes a user interface to output the alert. Thus such a system allows the user to get an alert, for example a phone call, if they leave Wi-Fi range, or if their geodetection shows they have left the packing area without the required resources. It is noted in this respect that the term "a location of the container" can be an estimated location, for example the location of a user of the container who is assumed to be sufficiently co-located with the container.

The system may further have a set of platform Application Program Interfaces (APIs) that applications can call to read/write which items are required. For example, a sales appointment system may call into the platform API to read which sales assistants on the road have a particular item (e.g. a sample of silk fabric or a brochure with braille business cards). It may further see if this item or resource is still in the office (and correlate this with which sales members have availability). If the resource is still in the office, it may write that a particular employee in the people database now has a REQUIRED RESOURCE (e.g. an item) in an expected set of items at a particular timeslot on a particular day. This would then ensure that before that person left the office on that day, they would be alerted if they hadn't picked up the required item. Further configuration is possible, e.g. to indicate that a given resource is expected to be on the person when departing (e.g. from the base office or from home) but not when returning (e.g. from the customer or school), for example a carpet sample may be left at the customer's premises but the salesman's laser tape measure should not be, in which case the expected set for the base packing area can be modified for the destination packing area to reflect this.

The containers are configured to connect to the centralized (back-end) item tracking system. As such the item tracking system can track multiple instances of containers and multiple instances of items, e.g. which sales collateral should be in which briefcase for which type of customer. Apps may also be incorporated in the system that dynamically change which people need to have which resources with them, for example having associated particular items with particular containers, and optional further association may be made for a particular container with a particular person. This can be particularly useful for relatively large organizations tracking a large number of containers and items, and in some case, a large number of people.

An additional problem is that certain scenarios require the user of the container to dynamically alter which items they carry based on attributes known about where they are going (e.g. which type of customer are they visiting). Embodiments of the invention provide a convenient and reliable mechanism for an organization to ensure that a given container has the right items when it is taken to a customer's premises. The embodiments described herein therefore also provide an additional input of context information which is used in determining the expected set of items for a particular container.

Items may also have a state (e.g. is a drill sufficiently charged or not). Packing areas and locations may also have a state, e.g. what is expected to be left at the customers vs. brought back to base. Accordingly, the expected set may vary for a container for different packing locations depending on their properties. Further to this information it may be possible to determine one or more items which may need preparation ahead of time, e.g. the user needs to charge an electric drill 6 hours before they leave. Such information may be used to provide an alert a pre-determined amount of time before an expected time of leaving the packing area, or at a certain time of day etc. If the container leaves the packing area with an item in an unexpected state, an alert may also be outputted in response. That is to say the items in the container can also send proactive alerts. For example, rather than the container checking that the charge on the drill is sufficient, the container may send a message to the drill indicating an intended destination and the type of job being carried out there. The drill may then reply with a message indicating that it is sufficiently charged or that another 5 minutes of charging is required. Similarly, as one or more jobs proceed during the day, items may proactively send alerts to the container communicating their state rather than waiting for the container to check the particular property state of any particular item.

FIG. 2 is a schematic diagram of a computer system 200. Various elements of the computer system 200 and connections between these elements are shown, including the item tracking system 102 and its connections via a network 204. Item tracking system 102 is connected to network 204 (e.g. the Internet, the cloud, or any other network through which digital information and data may be sent, for example via a cloud platform of the network 204) and is implemented as a back end system in the example of FIG. 2. Via the network connection the item tracking system 102 is able to communicate with a number of different entities by which it can receive information for inputting to the item tracking system 102 via the various inputs discusses in FIG. 1. Similarly, information can be output to any of the entities connected to the network 204. The computer system 200 comprises at least one mobile device 212. The mobile device 212 comprises a user interface 120 through which the alert of the item tracking system is outputted to a user of a container. The mobile device 212 may be any suitable mobile user device (e.g. a tablet device, a smartphone device, a laptop device etc.). The mobile device 212 comprises one or more suitable network interfaces via which it can connect to the network 204. The system 200 also comprises a location sensor 214. The location sensor 214 is used to sense and thus track the location of the container. Thus it may be contained physically within the container, constitute part of the body of the container. Additionally, the location sensor 214 may be a separate item in its own right, or form part of another item separate from the container but assumed to always be co-located or within close proximity to the container. For example, this may be the GPS locator within the mobile device 212. In this case it is assumed that the user of the mobile device will take the mobile device 212 with them when they leave the packing area with the container, and as such the GPS location of the mobile device 212 also being able to be used to indicate the location of the container. The system 200 also comprises item sensor 216. The item sensor 216 senses what items are currently within the container. Depending on the method of sensing, the current items within the container may be defined as the items sensed as being those within the scanning or detecting range of the sensor. For example, if the sensor is an RFID scanner, the RFIDs within range of the scanner will be determined as currently within the container (with the RFID scanner having a suitable range for the size of the scanner etc.).

The system comprises various databases i.e. Item Database 206, Container Database 208, and People Database 210. Each of the databases may be distributed throughout the system, in one or more physical locations. The Item Database 206 can include all instances of items known to the system. This may comprise a list of physical items and their tag ID (e.g. RFID identifier). For example, all items fitted with an RFID tag will be identifiable and correspond to an entry in the item database. The ID corresponds to a specific instance of an item. That is to say it is a unique ID for a specific instance of an item. The item database includes details about the items in various levels of detail. For example, a generic description like 'a book' is included as a class of the item ID. Thus each unique ID can be labelled as belonging to a particular class which identifies the type of item, for example by International Standard Book Number (ISBN) number for a book. A more detailed description like 'a history book', or a very specific description referring to one instance of an item like 'Bob's history book' may be added as metadata for the item ID. This metadata can be held in the item database as a description of the item in question, and may be used by the expected set determination module 104 to form the associations between items and containers. Unique identification may not be important, for example in the case of something like a tool. In some cases, it may be desirable to have multiple physical copies of the same item (e.g. 4 of the same hammer), so that if the system detects that hammers 1, 2 and 4 are pre-allocated, hammer 3 is still available. Given a tool box it may only be important that an instance of a particular class of item be present, like a particular type of drill. Thus very detailed metadata, where a specific instance of an item is identified, may not always be necessary for the expected set to be determined. Therefore, a further type of comparison may be made which identifies that the item sought is not a particular instance of an item, but rather confirmation the user has at least one instance of a class of item meeting the desired criteria (e.g. measuring instruments). That is the expected set can simply specify that a particular class of item is expected, without necessarily indicating a specific instance.

The Container Database 208 comprises information on all containers of the system. Such a database may also be used to determine what items are expected to be within a specific container. The container database may include contextual information on what type of container any one container is. For example, a school bag, or a work bag, a tool bag, or a toolbox. The container could be a small container like a bag, or a large container like a work van, and container suitable or capable of containing a number of items. Each container may then, based on this contextual information, have a number of items associated with it. For example, a school bag may be associated with a number of books. A work van may have a group of tools associated with it. A briefcase may have specific client files associated with it. Thus a set of expected items for any one of a plurality of containers can be determined. The container database may also contain a real-time list of which resources are detected to be in a given container (be it a bag, a case, a van etc.). It may further record which employees use which container(s). The word container is used herein to mean any object, vessel, or receptacle for holding or transporting another object. The container may also be capable of connecting to a network through an interface.

The system 200 may be further enhanced with the inclusion of People Database 210. The People Database 210 may identify the people able to use any one or more containers having any one or more expected items of content. For example, a list of which employees exist in the system (or a list of school children in a house). For example, this database may be the Microsoft Azure Active Directory system. The people database may identify the owner of the container, and may not necessarily be limited to the owner or user being present. For example, a self-driving car or van, though the user may not be physically present, may still identify the user from the people database as the person who owns the van, the person able to use the van, or the person whom owns or will use the contents. The people database also allows for the expected set of items of a container to be specified more precisely. As with the example given above, there may be certain items associated with a specific person as well as a specific container. As well as a specific persons' association with a specific container. So if it is known that a particular container is used by one person at one time and another person at another time, the item tracking system can take the person using the container into account when determining the expected set of items for the container. That is to say information from the People Database 210 is used to determine the expected set of items for a container.

In embodiments, the system 200 comprises a personal information manager system server 218. The personal information manager system server 218 is capable of connecting to network 204. Server 218 is thus a server of the network 204 and may be distributed throughout the network, in one or more physical locations, as software, hardware, or any combination thereof. The personal information manager system is any system for tracking and maintaining personal information, and provides contextual information to the item tracking system. That is to say it is service, such as Office 365 or Outlook etc., through which people manage their schedules, calendars, arrange meetings, email colleagues, plan holidays, and maintain class timetables etc. For example, such a computer application may contain a calendar, a contacts list, a call log, a meeting schedule, a travel itinerary, a class timetable, a task list, a workflow, emails, instant messages, task data, customer data, any other form of workflow and/or productivity data, or any other type of personal information that might inform the item tracking system and thus help to create an expected set of items for a container at a particular time. The inclusion of this contextual information allows the item tracking system 102 to make expected sets of items for containers that may change over time, may be able to determine who is using a container at any one time, as well as account for the destination of the container and user. As such the expected set of items can be determined in order to meet the requirements of the specific person when they reach their destination e.g. their meeting with Bob, or their history lesson at 11 am. For example, a school child may be associated with a class timetable, a salesman with a customer or product demonstration, and a technician with a particular type of repair. In this manner, it is possible to determine an expected set of items that is "real-time", in the sense that it is updated throughout the day as the context changes. This then allows a person with a container to receive real time alerts when the expected items list changes while are they out on site/at school etc., alerting them they will need to return to base or a specific packing area to retrieve certain missing items.

Thus it can be understood that input(s) 106 discussed above in reference to FIG. 1 can be provided by any of databases 206, 208, 210, and server 218, to provide the expected set determination module 104 with contextual information to be used in determining an expected set of items for the container.

FIG. 1 shows a schematic diagram of the item tracking system 102 representing functionality implemented by the item tracking system 102. The item tracking system 102 comprises the expected set determination module 104. The expected set determination module 104 generates an expected set of items for the container in question based on at least one type of data input 106 associated with it. For example, a toolbox or tool-belt will be expected to contain tools, a school bag will be expected to contain books and a pencil case etc. The item tracking system 102 also comprises item tracking module 108. The item tracking module 108 tracks the items currently located within that same container (current set). The items are tracked by the item tracking module 108 based on input 110 from at least one item sensing device (item sensor 216) associated with the container. The item tracking system 102 also comprises comparison module 112. The comparison module 112 receives the expected set from the expected set determination module 104 and the current set from the item tracking module 108. The comparison module 112 then compares these sets to determine if any items of the expected set are missing from the current set as tracked by the item tracking module 108. The item tracking system 102 also comprises a location tracking module 114. The location tracking module 114 tracks the location of the container. That is, the same container associated with the expected items of the expected set determination module 104 and the current set of items tracked by the item tracking module 108. The location tracking module 114 determines the location of the container based on associated location information received via input 116 from the location sensor 214. The location may be determined as an absolute location such as GPS coordinates, or extrapolated based on a distance traveled relative to a location for which GPS coordinates are defined. Thus it may be determined whether the container has moved a predetermined distance away from GPS coordinates defined as 'Home' or some other reference location. The pre-determined distance defines a packing area, thus enabling the location tracking module 114 to determine that the container has left the packing area. That is to say, when it can be determined the container has moved a sufficient distance from a particular reference location with defined GPS coordinates, it can be determined that the container has left a particular packing area. For example, the known location could be 'Home', or 'The Office', or more specific such as 'The London Office' or 'The Camden Office' or 'Client 1's Office' or 'Bob's Office'. The item tracking system further comprises alert module 118. The alert module 118 receives input from the comparison module 112 and the location tracking module 114. Based in those inputs the alert module 118 determines whether to output an alert, to the user of the container. The alert is outputted in response to determining the container has left the packing area with any of the expected items missing. The alert is output via the user interface 120, which in the example of FIG. 2 is part of the mobile device 212 but could also be an interface of the container itself as noted. Therefore, if it is determined that at least one of the expected items is missing, and that the container has left the packing area, in response an alert is outputted to the user of the container via a user interface 120.

Continuing to refer to FIG. 1, the expected set determination module 104 receives the at least one input 106 and outputs the expected set of items to the comparison module 112 via connection 406. The item tracking module 108 receives the at least one input 110 and outputs the tracked items currently within the container to the comparison module 112 via connection 402. Comparison module 112 receives inputs from the item tracking module 108 via connection 402 and the expected set 104 via connection 406. These item sets are compared, and the comparison module 112 then outputs the results of the comparison to the alert module 118. The location tracking module 114 receives the at least one input 116 indicating the location of the container. The location tracking module 114 then outputs an indication of whether the container has left the packing area (and optionally also the location of the container) to the alert module 118 via connection 404. The alert module 118 receives inputs from the comparison module 112 indicating any missing expected items, and from the location tracking module 114 indicating at least whether the container has left the packing area. The alert module 118 sends an output to the user interface 120 which outputs the alert to the user.

As will be appreciated, FIG. 1 is a highly schematic functional block diagram, where the various modules represent different functionality implemented by the item tracking system 102. This functionality is implemented by item tracking code when executed on at least one processor (e.g. Computer Processing Unit (CPU) or CPUs) of the item tracking system 102.

Figure 6:
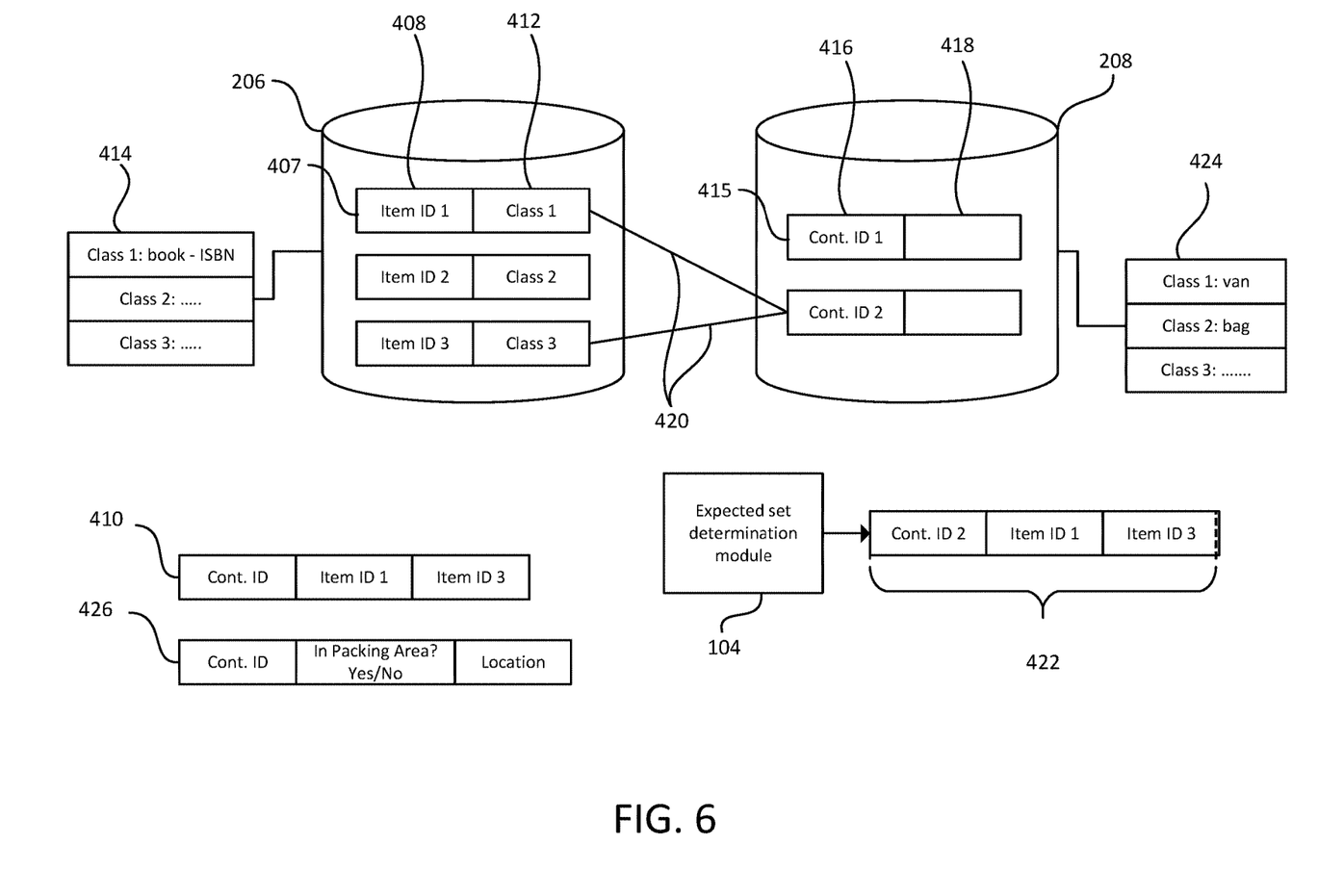
FIG. 6 illustrates the item database and the container database data structure.

FIG. 6 illustrates the item database 206 and the container database 208, and how the expected set determination module 104 can use the information therein to determine the expected set of items in the container.

Item database 206 is structured so that each item of the item tracking system has a unique item identifier 408. Each item identifier 408 is then associated with a class 412. For the item database 206 the class 412 determines what the item is (for example a certain book and its ISBN number), from a set of available item classes 414 associated with the item database 206. A given item may belong to one or more of classes 414, for example, a set of pencils may belong to "math pencils" and "art pencils", or a given drill may belong to "masonry drill" and "wood drill". The set 414 defines all classes of items which can exist in the item database 206. Container database 208 has a similar data structure for the containers 302 of the item tracking system. Each container is given a unique Container ID 416, such that it may be uniquely identified among all the containers of the item tracking system. The container IDs are also labelled with a class 418. For the container the class 418 indicates the type of container (for example a bag or a van etc.) from a set of available container classes 424 denoting all classes of containers which can exist in the container database 208. Similarly to items, a given container may belong to one or more of classes 424. As a result, this information is available to the expected set determination module 104 for use in determining associations 420 between the items of the item database 206 and the containers of the container database 208. These associations 420 make up the expected set of items for each container 302. For example, expected set 422 comprises container ID 2, and item IDs 1 and 3 to indicate those items are expected for that container. It is this information that is passed from the expected set determination module 104 at connection 406 to the comparison engine 112.

Alternately, instead of unique item IDs (instance), at least one item in the expected set may simply be indicated by class. That is, a class ID may be used instead where individual items in that class are interchangeable. More common that the expected set is class ID 1 and 3, rather than item ID 1 and 3—the reason being that if the items of a given class truly are equivalent, then the system should be agnostic to the user taking any item of that class. For example, where the items are carpet samples, and the classes are carpet patterns, any sample with the correct pattern may be sufficient for a salesman.

The item ID 408 and its associated item class 412 form part of an entry 407 representing one item, which is an instance of that item class. Multiple instances of the same item class can exist in the item database 206 to represent 'identical' items. Likewise, the container ID 416 and associated container class 418 constitute an instance 415 of that container class, representing one container. Multiple instances of the same container class can exist to represent 'identical' containers. Different item/container instances in the same item/container class are distinguished by the item/container ID.

Information received from the item tracking module 108 can therefore be compared against the expected set of items by the comparison module 112. The detected items 410 are indicated using their item ID 408. Thus information passed from the item tracking module 108 to the comparison module 112 through connection 402 comprises the unique IDs 408 of all the items detected, and form the current set of items.

The comparison module is then able to indicate to the alert module whether the expected set of items and the current set of items match for any given container, by matching the container IDs for the expected and current sets. Any missing items may then further be identified via their unique item IDs.

The location tracking module 114 is provided with location information for a plurality of containers 302. The information 426 provided by the location tracking module 114 to the alert module 118 comprises the container ID 416 and the location of that container. This information is then used to determine whether the identified container has left the packing area or not.

FIGS. 3a-4b illustrate the presently discussed item tracking system in use.

Figure 3A:
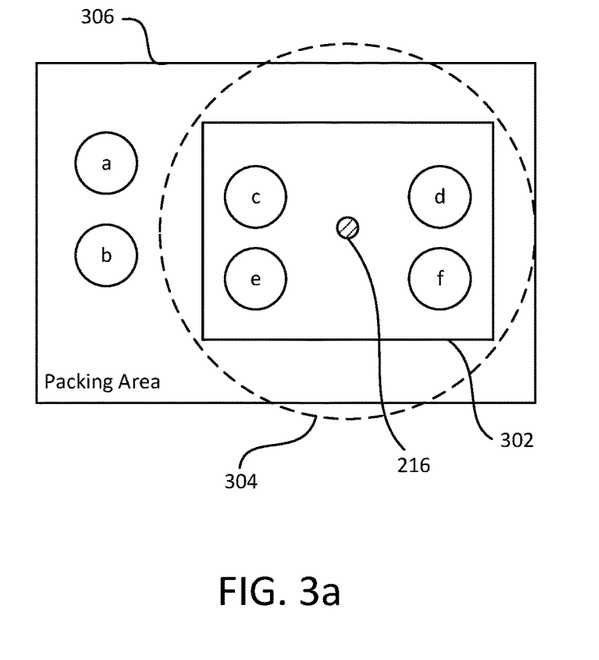
FIGS. 3a and 3b illustrate one example of when an alert may be generated as a container leaves a packing area.

FIG. 3a illustrates a container 302 which contains items 'c', 'd', 'e', and T. The container 302 comprises (or contains, as discussed above), item sensor 216. In this example the item sensor 216 is a sensor such as an RFID scanner. The range of the item sensor 216 is shown with dotted line 304. The illustrated range is one of a circle with fixed radius where the center-point is the sensor 216. However, it should be understood that in embodiments the sensor range can be uni-directional, bi-directional, or multi-directional, or with no specific shape. Further the range of sensor 216 may have an adjustable radius or adjustable dimensions. It should be understood that an item sensor with a suitably sized and shaped range for the particular container would be used. Items 'c', 'd', 'e', and 'f' lie within the range of item sensor 216. As such they may be determined to be within container 302. The container 302 is shown inside of packing area 306. Packing area 306 is a defined area within which the packing of the container 302 with any of items a-f takes place. As can be seen in FIG. 3a the items 'a' and 'b' are also within the packing area, but have not been placed within the container 302 and are not in range of the item sensor 216.

Figure 3B:
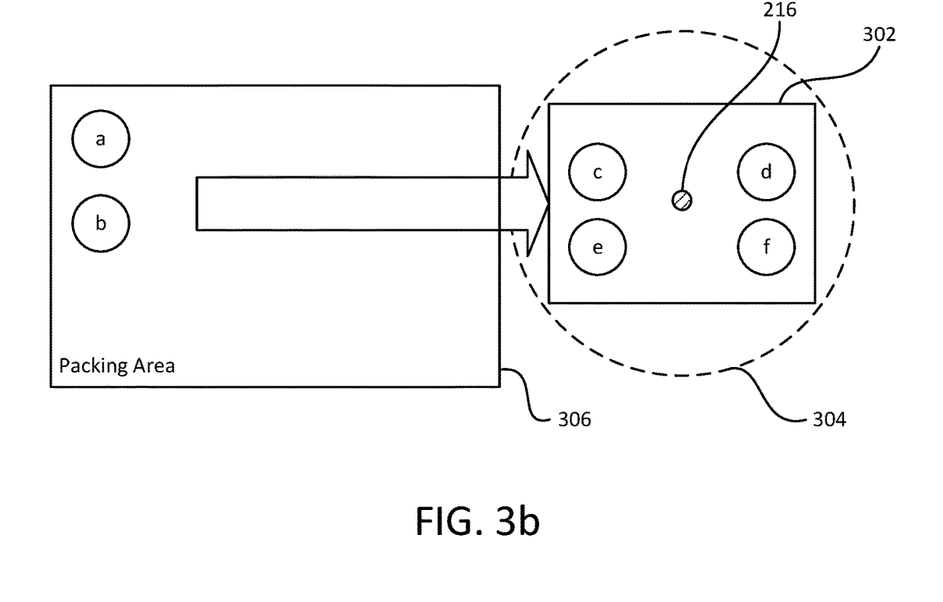

FIG. 3b illustrates the container 302 having left the packing area 306. When the container 302 leaves the packing area it may be determined that the items 'a' and 'b' have been left behind. Thus in keeping with the item tracking system discussed above, an alert may be sent to the user of the container in response to the container 302 leaving the packing area 306 with items 'a' and 'b' missing. In order to cause the alert to be outputted the items 'a' and 'b' must be items of the expected set of items for container 302. If items a and b are not determined to be part of the expected set of items for container 302, then determining the container 302 has left the packing area 306 with items 'a' and 'b' missing will not cause the alert to be outputted. Similarly determining the container has not left the packing area while items 'a' and 'b' are determined to be missing by comparison of the expected set of items with the current set of items as sensed by item sensor 216 will not cause the alert to be outputted to the user interface.

In FIGS. 3a, 3b, 4a, and 4b packing area 306 is shown as a rectangular area. However, it should be understood that the packing area may be defined as an area of any shape, regular or irregular. The packing area, although described in embodiments as an area, may be a single location, with a single set of coordinates (for example GPS or 3-dimensional), such that it may be described as a place or point rather than an area. As such 'leaving' the packing area may be defined as moving a pre-defined distance from a place or point within the packing area, and not necessarily crossing a boundary or leaving a bounded area defined as the packing area. The area may be irregular, such as the boundary wall of an office building or the perimeter fence of a business. It may also be that packing areas are classified. I.e. a base packing area or a remote packing area. As such a location being visited, where the contents of the container may be changed, or removed and replaced, could be identified as a remote packing area. A location such as home or the office may be similarly identified, but as a base packing area.

Figure 4A:
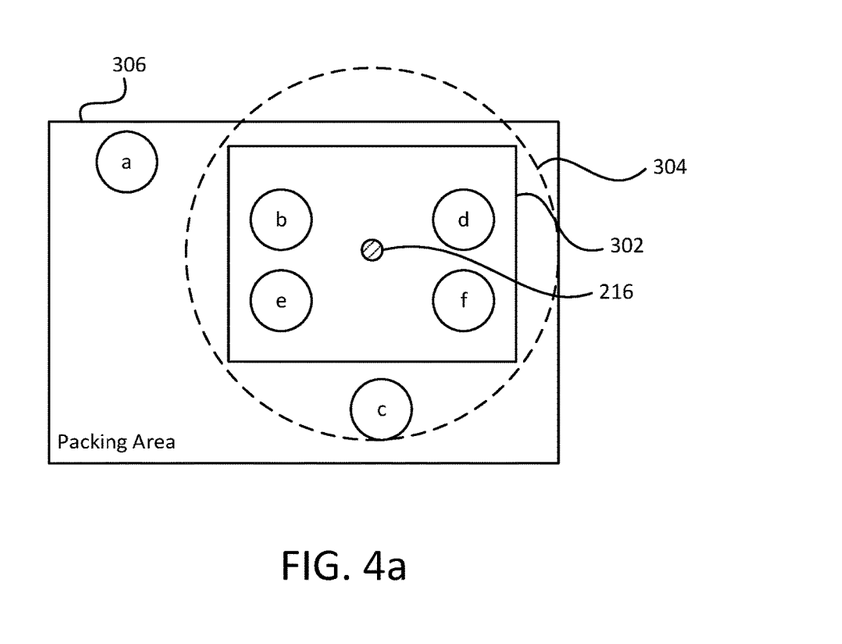
FIGS. 4a and 4b illustrate another example of when an alert may be generated as a container leave a packing area.

FIG. 4a shows the container 302, and items a-f similarly placed as in FIG. 3a. However, item 'b' has now been placed within the container 302 at the position where item 'c' had previously been placed in FIG. 3a. Item 'c' has been removed from the container 302 but still remains within the sensor range of sensor 216. Both container 302 and all of items a-f are within the packing area 306. Although in this situation the sensor 216 can detect item 'c', and would determine therefore that item 'c' was present in container 302. However, the present item tracking system requires two conditions to be satisfied before causing an alert to be transmitted. This provides an advantage over traditional technologies where detection, for example using RFID tags, of item 'c' would result in it being reported as present, but ultimately left behind.

Figure 4B:
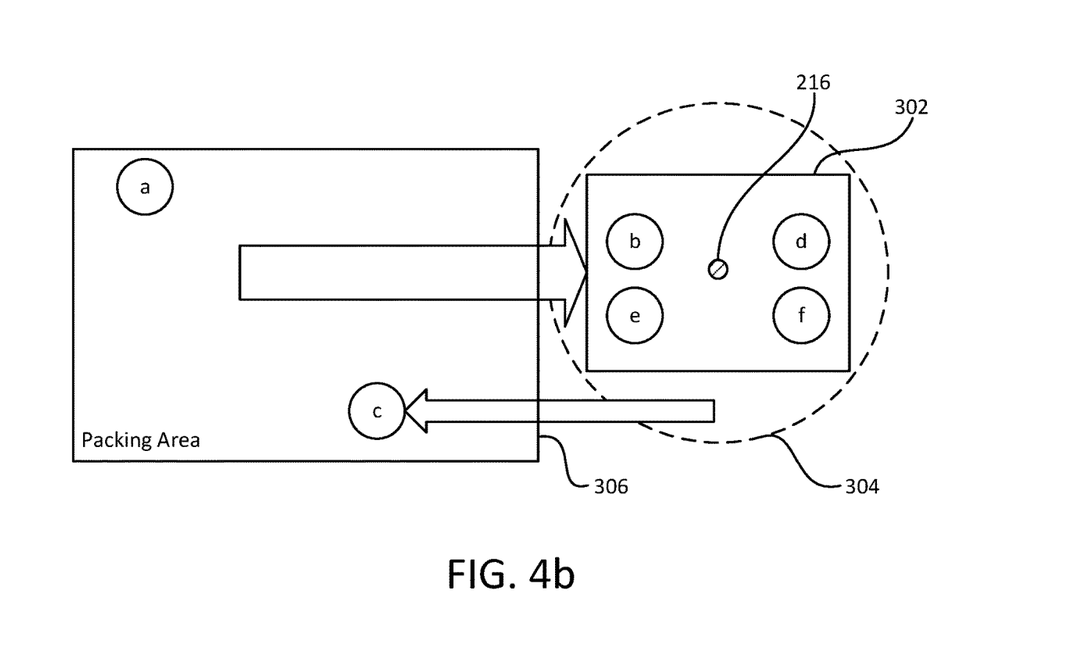

FIG. 4b shows container 302 having left the packing area 306. Subsequently item 'c' is left behind. In traditional technologies, where the item is determined to be present or not simple based on whether it has been detected or not before the container 302 leaves the packing area 306, item 'c' would be incorrectly determined as present. That is to say because traditional technologies, unlike in the presently discussed item tracking system, do not stipulate that the comparison between the expected set of items and the current set of items is made in response to container 302 leaving the packing area 306, item 'c' would be left behind. Therefore, the present item tracking system has the advantage of sensing the current set of items and making the item set comparison when it can be determined that the user has concluded packing and is on their way to their destination. That is to say the alert is outputted to the user in response to both the condition that the container has left the packing area and the condition that an item is missing from the container 216. As a result, a number of deficiencies in technologies that rely solely on item detection to cause the alert are circumvented. Similarly, deficiencies in technologies where either the alert is transmitted before the container is finished being packed, or based on an outdated current set of items detected are also avoided.

For example, reporting that an item is missing from a container while the container is still being packed is of no use to the user, who may have always intended to continue packing and include the missing item. Thus unnecessary alerts are avoided. Similarly alerts outputted when a container leaves a location, but based on an item comparison performed at an earlier time, before packing had been finished, are avoided. Such an alert may incorrectly report that an item is missing, when it was actually packed subsequent to the item set comparison. Thus an unnecessary trip back to the packing area for a 'missing' item that is actually present in the container is avoided.

FIG. 4b illustrates a further quality resulting from the dual criteria for outputting the alert. That is the situation where an item is close enough to sensor 216 to be reported as present while packing, but is not actually inside container 302. As a result of the dual criteria used in the presently discussed item tracking system the current set of items does not include item 'c' when the container 216 leaves the packing area 306. Thus avoiding item 'c' being incorrectly determined as present in the container, when in reality it has been left behind. It is a common scenario when packing items into a container that the desired items might be gathered before packing, outside the container in a nearby location. Similarly, it is common that this in itself leads a person to believe they have gathered any one item in particular and continued to pack the item. However, occasionally the item is left in the nearby location and in reality forgotten. A technology based item tracking system seeks to prevent the situation of items missing from a container. Thus such the situation where the sensor may also sense the nearby item (which is not inside the container), can also be considered and prevented in this way. Determining the current set of items in response to the container leaving the packing area reduces the chances of this type of error occurring.

Figure 5:
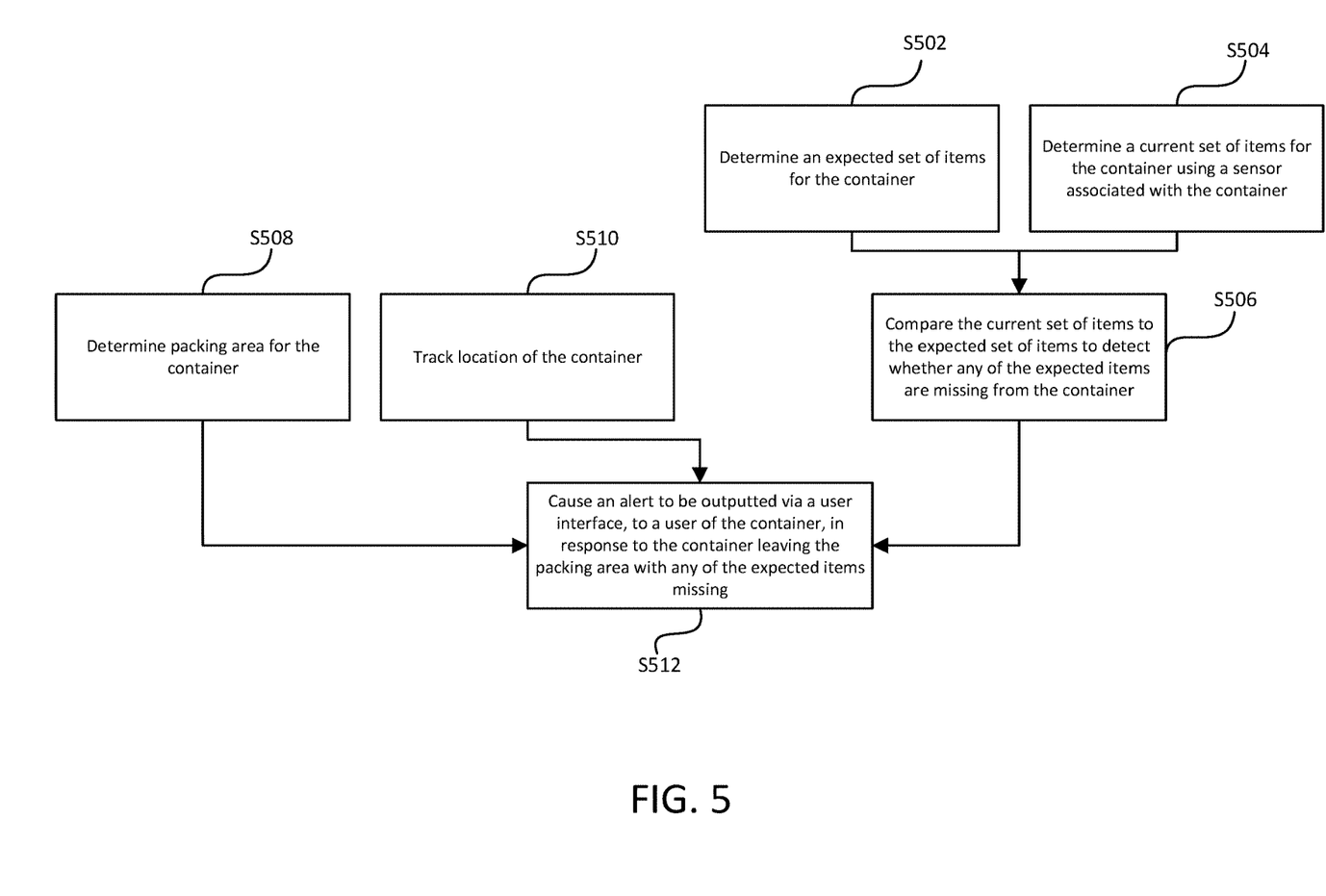
FIG. 5 shows a flow chart for a process of outputting an alert via a user interface in response to a container leaving a packing area with an item missing.

FIG. 5 is a flow chart for process 500 of packing container 302 using the presently discussed item tracking system.

The process 500 starts at step S502 where an expected set of items for the container is determined. In embodiments, this expected set of items is based on contextual information. In embodiments, this can include a number of inputs including those from a people database and/or a personal information manager system server.

At step S504 a current set of items for the container is determined using a sensor associated with the container. The current set may be determined before leaving the packing area, or it may be determined upon the container leaving the packing area.

The process then proceeds to step S506 where the determined expected set and the determined current set are compared, and thus it can be detected whether any of the expected items are missing from the container.

Also part of the process 500 is step S508, where there is determined a packing area for the container. The packing area being an area within which the container is to be packed. For example, an office, a house, a warehouse, etc. In some contexts, a packing area in the base location (home or office), there may be one or more destination packing areas defined in contexts where it is important not to leave certain items behind unintentionally as it is not to remember to bring them.

Further to this is step S510 where the location of the container is tracked. As such it is possible to determine whether the container is currently within or outside of the packing area.

Subsequently is step S512, which comprises causing an alert to be outputted via a user interface, to a user of the container, in response to the container leaving the packing area with any of the expected items missing. That is to say an alert is only output if it is determined that both the container has left the packing area, and that there is an expected item missing from the current set of items in the container.

It should be understood that while there may be a packing area at a base location (home or office), there may also be defined further packing areas at the one or more destinations. It is thus possible to make sure not to leave items behind unintentionally at a destination, as well as to remember to bring them to the destination.

In embodiments, the alert is an audio alert and/or a visual alert and/or a physical alert such as a vibration of the mobile device. The alert may include no specific information, and simply attract attention of the user to that fact they have left something behind. In embodiments, the alert may include further information such as which item is determined to be missing. That is to say which item is in the expected set of items, but not in the current set of items. The alert may also be sent to an intermediary (e.g. a supervisor), who may be notified that a given user has left, and the intermediary may independently communicate with the user to notify them of the alert. Similarly, there may be an inner gate and an outer gate to a premises, and the outer gate guard receives the alert if the container, e.g. a vehicle, is detected to have forgotten an item, and stops the vehicle when it reached the outer gate. In this case, the user interface is part of a device available to the intermediary.

The tracking of the location of the container may comprise a GPS tracker inbuilt into the container. However, the location of the container may be determined by assuming the container is co-located with the user interface of the mobile device, and thus the GPS of the mobile device may provide the location data for use in determining the location of the container. Similarly, other GPS enabled devices that could similarly be assumed to be co-located with the mobile device comprising the user interface through which the alert is output. The co-location assumption is based on the GPS enables device having the same user as the container. However, this may be an assumption rather than based on specific information. For example, another GPS enabled mobile device could be a smart watch, a fitness tracker, Google glasses, or any other such device usually kept on a user's person. That is to say in a pocket, on the wrist, face, or around the neck of a user. Alternately, cameras or other sensors may be used to monitor a given item being taken from one location (or fail to be taken).

The container (or the further mobile device or person known to be associated with the container) may emit some type of signal, e.g. radio waves, containing the container ID. Thus the location sensor (or plurality of sensors) may itself be a regular radio wave detector (or phone communications radio mast) that listens for signals with a given ID, and then triangulates the location of the container and communicates this back over the network to the rest of the system (network-centric positioning). Triangulation can be performed by the device itself based on signals received at the device (device-centric positioning), and communicated back to the system. For example, in a cellular network, both forms of triangulation are possible based on signals received from the device at cellular base stations (network-centric) or signals received at the device from the base stations (device-centric).

Facial recognition on Closed Circuit Television (CCTV) could also be used to track a given user. Where the face of the user is determined within video from camera X, which is known to be physically located in location Y, where location Y is considered to be in a range where the person has "left the office" In this context, the location sensor is a (CCTV) camera, and one or more such cameras can be used.

The container itself is connected to a network, for example the Internet. In some implementations this may be via a Wi-Fi connection when the bag is at home, or the vehicle is in a garage. In other implementations, this could be connected over a 3G or cellular network. In still other implementations, the container may be physically plugged into the network to access the Internet.

Examples of an item sensors which could be used in this system are Near Field Communication (NFC), such as RFIDs, barcodes, or QR (quick response) codes. Also methods in personal area network (PAN) and wireless personal area network (WPAN) technologies, such as IrDA (Infrared Data Association), Wireless Universal Serial Bus (USB), Bluetooth, Z-Wave, ZigBee, etc. As well as body area network (BAN) technologies.

The invention requires one or more containers with a method of detecting which resources are currently contained within it. Items may also have sensors and the ability to connect with the network, such that an item associated with a container may sense that it is inside said container, and report as such to the network. Similarly, such an item may report to the network that it is not inside the associated container. That is, one or more item(s) themselves may be used to detect when an expected item is not in the container. The current set of items can thus be determined via various methods. In one implementation, the resources or items (books, materials, tools etc.) may have RFID tags embedded or attached. In another embodiment the container may have slots (e.g. a toolbox with a certain sized hole that only fits e.g. a laser tape measure). In other embodiments the container can detect the presence or signal strength of a Bluetooth (or other) connection of the item or resource to determine if it is in the container (e.g. if an electronic sensor on a meter reader is sending out a signal that is picked up when the meter reader is placed in the back of a van).

The item database may include other identifying qualities. Descriptive information and relevant metadata could also be taken from a description linked to the ISBN number. The ISBN may also be used as the ID if the book need not be distinguished from other instances of the same book. Items may be identified by shape or weight. Where the item can then be identified based on detection of these physical qualities. For example, if the item's shape fits a slot in the container, or if the item's weight when placed in the container has a unique numeric value. An item may be identified using image recognition. For example, image recognition by comparing images of the items stored in the item database to an image of an item captured using a webcam. An item could also be identified by directly connecting to a common network. That is to say an item which itself comprises an interface capable of connecting to a network (e.g. Wi-Fi, 3G, Bluetooth, etc.), and as such either communicating a unique ID, or reporting its presence directly to another entity to which it is connected (either directly or via a common network).

The item database may further include information about a given item's properties. For example, if a drill must be charged before taking it to a site, an alert may be output before the container leaves the packing area. Thus upon determining that such an item is part of an expected set, and the container has yet to leave the packing area, the property is indicated or identified as something that may require checking by the user. In some cases, where there is a plurality of instances of equivalent items with certain properties available (e.g. portable drills with batteries), the system may check that the specific instance of the item detected within the container (or available at the specific packing area), has the correct properties (e.g. a sufficient amount of charge). This property may be able to be checked by the item tracking system given some contextual information, or via information retrieved from the item itself (e.g. a transmitted message or indicator). Instances of items may subsequently be identified as unsuitable (i.e. insufficient in charge), or unavailable (i.e. already at another location other than the current packing area).

Similarly, if an item is known to need preparation (e.g. a cake) or is hard to retrieve (e.g. an item from a large warehouse), the system may give advance warnings to bring these. The system may further detect that the user has recently carried out an activity to enable this (e.g. used an oven, visited the warehouse, charging a drill) in order to avoid outputting the alert when it is no longer needed.

Additionally, it may be that a particular instance of an item or given resource is expected to be left at a destination. That is, contextual information may allow a determination to be made by the item tracking system that an item is to be removed from the expected set of items for that particular container for use upon leaving a further different location (a further packing area), after a meeting. As such the item would then not be part of the expected set of items when leaving this further packing area (e.g. from a customer or school). For example, a carpet sample may be left at the customer's premises. Subsequently an alert may be outputted in response to this item being detected where it is no longer part of the expected set of items for the container.

An example of the item tracking system may be a work van having a slot for each tool. Thus all the slots are expected to be filled, forming the expected set of items. The slot may have a weight or pressure sensor to determine whether a tool (or the correct tool), is present in the slot at any instance in time. If a tool is determined to be missing from a specific slot the output alert may indicate only that an item is missing, the user is thus not aware which tool is missing until looking to see where the empty tool slot is. The tool slot maybe identified as slot 7, but information identifying the specific tool that is missing from slot 7 may not be included in the alert, and the user may not know which specific tool is missing until he looks at the empty slot 7. An item database is therefore not necessarily a requirement for the item tracking system to work. For example, determining simply whether an item is present or not is enough to determine that an item is missing, the item itself may not need to be identified.

The described technology thus provides a comprehensive system for managing physical container. Items in particular containers can be tracked based on a collection of contextual information such as container type, user attributes, resources, usage requirements, and or workflow and productivity data, held in the relevant databases or retrieved from the personal information manager system as applicable.

Using contextual information, it may also be possible to order the contents of a container. That is to say the items which can be associated with the same context, such as all the resources for a specific meeting or all the tools for a specific repair, can be placed within the container in the order they will be needed or similarly grouped within the container. Further the items may also be identified as to whether they are durable items that do not want to be left behind, or items which are disposable or used up. For example, a durable item may be a screwdriver, but the expendable items that would be expected to be left behind would be a number of screws. Similarly, the item may be identified as an easily replaceable item, such as a pen, where although the pen is durable it is easily replaced, or an alternative is easy to locate.

It should also be understood that it may be desired to determine any extra items in the container. That is to say it may also be desired to determine whether there are any items in the current set of items that are not part of the expected set of items. Thus there may be a further class of alert, which indicates if the user mistakenly puts two instances of a given class of item in the container (i.e. when only one is needed). The system may then alert the user since they may have mistakenly taken a scarce resource that someone else will need.

In the above description, numerous specific details are set forth to provide a more thorough understanding of the described embodiments. However, it will be apparent to one of skill in the art that the described embodiments may be practiced without one or more of these specific details. In other instances, well-known features have not been described in order to avoid obscuring the described embodiments.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally, any of the functions described herein (e.g. the functional modules shown in FIG. 1 and the functional steps shown in FIG. 5) can be implemented using software, firmware, hardware (e.g., fixed logic circuitry), or a combination of these implementations. The modules and steps shown separately in FIGS. 1 and 5 may or may not be implemented as separate modules or steps. The terms "module," "functionality," and "component" as used herein generally represent software, firmware, hardware, or a combination thereof. In the case of a software implementation, the module, or functionality represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for alerting a user when an item is missing from a container, the method comprising implementing, by an item tracking system, the following steps:
   determining an expected set of items for the container;
   using an item sensor associated with the container to determine a current set of items in the container;
   comparing the current set with the expected set to detect whether any of the expected items is missing from the container;
   determining a packing area for the container, the packing area including a static reference location;
   tracking a location of the container;
   comparing the location of the container and the packing area; and
   causing an alert to be outputted via a user interface, in response to the location of the container being outside of the packing area with any of the expected items missing.

2. The method of claim 1, wherein the list of expected items for the container is determined based on contextual information pertaining to the user and/or the container.

3. The method of claim 2, wherein the contextual information is held in a data store of a personal information manager system in association with a user account of the user and accessed from the data store.

4. The method of claim 2, wherein the contextual information comprises calendar data and/or email data and/or task data and/or customer data.

5. The method of claim 2, wherein the contextual information pertaining to the container is held in a container database and/or the contextual information pertaining to the user is held in a people database.

6. The method of claim 1, wherein the method further comprises determining a current state for at least one item, and determining an expected state for said item, comparing the current state with an expected state for the item, and outputting a second alert if the current state is unexpected.

7. The method of claim 6, wherein the second alert is outputted at a predetermined interval before an expected time of the container leaving the packing area or in response to the container leaving the packing area.

8. The method of claim 1, wherein the method further comprises determining based on one or more properties of a packing area, the expected set being determined for the packing area based on the determined properties of the packing area.

9. The method of claim 8, wherein a different expected set of items is determined for each of a plurality of packing areas based on one or more determined properties of that packing area.

10. The method of claim 1, comprising modifying the expected set of items for a destination packing area, by adding and/or removing at least one expected item, wherein once the container has arrived in the destination packing area, an alert is outputted in response to it leaving the destination packing area with any of the items in the modified set missing.

11. The method of claim 5, wherein the people database identifies the user as an owner of the container.

12. The method of claim 1, wherein the step of using the item sensor associated with the container to determine the current set of items is performed in response to the container leaving the packing area.

13. The method of claim 1, wherein each item is uniquely identified in an item database.

14. The method of claim 13, wherein each item is represented in the item database as an instance of one or more item classes.

15. The method of claim 1, wherein the container and/or at least one of the items in the container comprises a network interface for connecting to the item tracking system, wherein the item sensor connects to the item tracking system via that interface.

16. The method of claim 1, wherein the item sensor is a near field communication enabled sensor and/or a wireless person area network enabled sensor and/or a camera.

17. The method of claim 1, wherein tracking the location uses a location sensor, the location sensor is a GPS locator and/or a camera and/or triangulation circuitry.

18. An item tracking system comprising one or more processing units including:

an expected set determination module configured to determine an expected set of items for the container;

an item sensor input configured to connect to an item sensor associated with the container;

an item tracking module configured to determine a current set of items in the container using the item sensor;

a comparison module configured to compare the current set with the expected set to detect whether any of the expected items is missing from the container;

a location sensor input configured to connect to a location sensor associated with a container;

a location tracking module configured to track a location of the container using the location sensor and compare the location of the container and a packing area; and an alert module configured to cause an alert to be outputted via a user interface, in response to the location of the container being outside of a packing area with any of the expected items missing, the packing area including a static reference location.

19. The system of claim 18, wherein the item tracking system is configured to determine the expected set by creating associations between entries in an item database with an entry in a container database.

20. A computer program product comprising code embodied on computer-readable storage and configured so as when run on one or more processing units of an item tracking system to perform operations of:

determining an expected set of items for the container;

using an item sensor associated with the container to determine a current set of items in the container;

comparing the current set with the expected set to detect whether any of the expected items is missing from the container;

determining a packing area for the container, the packing area including a static reference location;

tracking a location of the container;

comparing the location of the container and the packing area; and causing an alert to be outputted via a user interface, in response to the location of the container being outside of the packing area with any of the expected items missing.

* * * * *